(12) United States Patent
Kageyama et al.

(10) Patent No.: US 11,046,264 B2
(45) Date of Patent: Jun. 29, 2021

(54) VEHICLE-MOUNTED EMERGENCY POWER SUPPLY DEVICE

(71) Applicant: Panasonic Intellectual Property Management Co., Ltd., Osaka (JP)

(72) Inventors: Youichi Kageyama, Fukushima (JP); Takashi Higashide, Fukushima (JP); Katsunori Atago, Fukushima (JP); Hisao Hiragi, Saitama (JP); Kazuo Takenaka, Fukushima (JP); Yugo Setsu, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 16/342,787

(22) PCT Filed: Jan. 12, 2018

(86) PCT No.: PCT/JP2018/000609
§ 371 (c)(1),
(2) Date: Apr. 17, 2019

(87) PCT Pub. No.: WO2018/139213
PCT Pub. Date: Aug. 2, 2018

(65) Prior Publication Data
US 2020/0055472 A1    Feb. 20, 2020

(30) Foreign Application Priority Data
Jan. 27, 2017    (JP) .............. JP2017-012694

(51) Int. Cl.
*H02J 7/00* (2006.01)
*B60R 16/03* (2006.01)
*H02J 7/34* (2006.01)

(52) U.S. Cl.
CPC .............. *B60R 16/03* (2013.01); *H02J 7/007* (2013.01); *H02J 7/0068* (2013.01); *H02J 7/345* (2013.01)

(58) Field of Classification Search
CPC ........................................................ H02J 7/00
See application file for complete search history.

(56) References Cited

U.S. PATENT DOCUMENTS

2013/0141052 A1* 6/2013 Rossel .................... B60L 58/26
                                                                    320/137
2015/0001926 A1    1/2015 Kageyama et al.

FOREIGN PATENT DOCUMENTS

| EP | 2352199 A1 | 8/2011 |
|---|---|---|
| WO | 2013/125170 | 8/2013 |

OTHER PUBLICATIONS

The Extended European Search Report dated Oct. 25, 2019 for the related European Patent Application No. 18744159.7.
(Continued)

*Primary Examiner* — Robert Grant
(74) *Attorney, Agent, or Firm* — McDermott Will & Emery LLP (57) ABSTRACT

An in-vehicle emergency power supply device includes a power storage unit including an electric double-layer capacitor, a charging circuit charging the power storage unit, a discharging circuit discharging the power storage unit, and a controller controlling the charging circuit and the discharging circuit. When the charging circuit charges the power storage unit, the controller determines a set full charging voltage of the power storage unit, determines a correction charging voltage lower than the set full charging voltage based on the set full charging voltage, and controls the charging circuit to charge the power storage unit until a stored voltage reaches the correction charging voltage. This
(Continued)

in-vehicle emergency power supply device stabilizes an output voltage thereof.

12 Claims, 9 Drawing Sheets

(56) References Cited

OTHER PUBLICATIONS

International Search Report of PCT application No. PCT/JP2018/000609 dated Feb. 13, 2018.

\* cited by examiner

Prior Art

VEHICLE-MOUNTED EMERGENCY POWER SUPPLY DEVICE

CROSS-REFERENCE TO RELATED APPLICATIONS

This application is a U.S. national stage application of the PCT international application No. PCT/JP2018/000609 filed on Jan. 12, 2018, which claims the benefit of foreign priority of Japanese patent application No. 2017-012694 filed on Jan. 27, 2017, the contents all of which are incorporated herein by reference.

TECHNICAL FIELD

The present disclosure relates to an in-vehicle emergency power supply device in vehicles.

BACKGROUND ART

Figure 10:
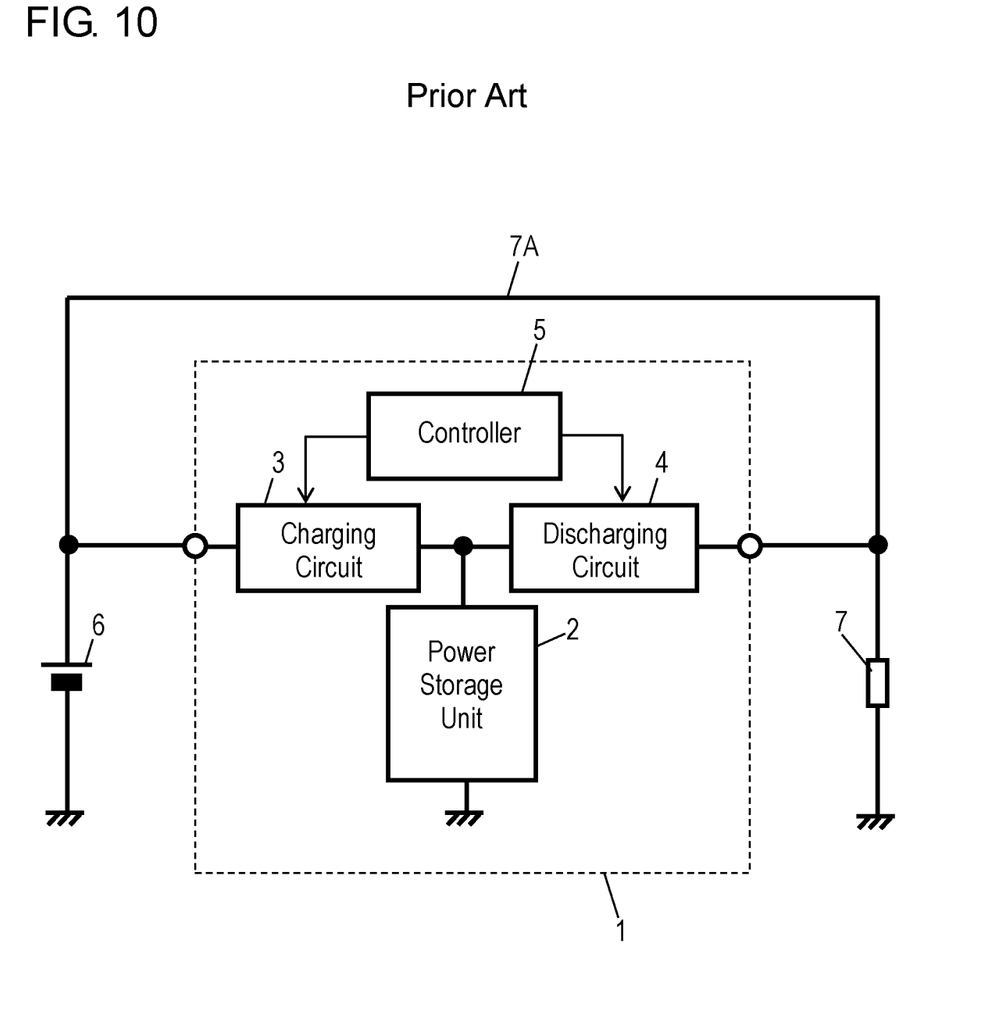
FIG. 10 is a block diagram of a conventional in-vehicle emergency power supply device.

FIG. 10 is a circuit block diagram of a conventional in-vehicle emergency power supply device. In-vehicle emergency power supply device 1 includes power storage unit 2, charging circuit 3 provided in an input path of power storage unit 2 to perform step-down operation, discharging circuit 4 provided in an output path of power storage unit 2 to perform step-up operation, and controller 5 that controls charging circuit 3 and discharging circuit 4.

Power is normally supplied to vehicle load 7 by connecting battery 6 to vehicle load 7 via normal route 7A. Charging circuit 3 is connected to battery 6 to step down a voltage of battery 6 and charge power storage unit 2. When a failure occurs in battery 6, discharging circuit 4 boosts a voltage of power stored in power storage unit 2 and supplies the power to vehicle load 7.

PTL 1 discloses a conventional in-vehicle emergency power supply device similar to in-vehicle emergency power supply 1.

CITATION LIST

Patent Literature

PTL 1: International Publication No. 2013/125170

SUMMARY

An in-vehicle emergency power supply device includes a power storage unit having an electric double-layer capacitor, a charging circuit that charges the power storage unit, a discharging circuit that discharges the power storage unit, and a controller that controls the charging circuit and the discharging circuit. When the charging circuit charges the power storage unit, the controller determines a set full charging voltage of the power storage unit, determines a correction charging voltage lower than the set full charging voltage based on the set full charging voltage, and controls the charging circuit to charge the power storage unit until a stored voltage reaches the correction charging voltage.

This in-vehicle emergency power supply device stabilizes an output voltage thereof.

DESCRIPTION OF EMBODIMENTS

Figure 1:
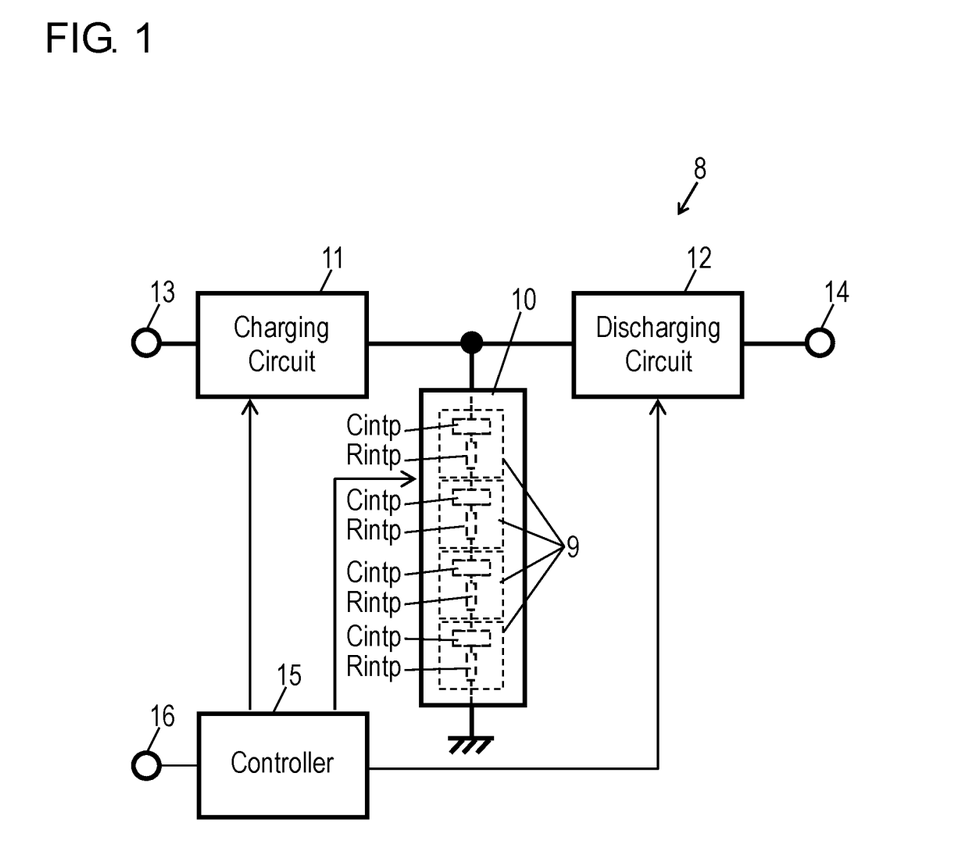
FIG. 1 is a circuit block diagram of an in-vehicle emergency power supply device in accordance with an exemplary embodiment.

FIG. 1 is a circuit block diagram of in-vehicle emergency power supply device 8 according to an exemplary embodiment. In-vehicle emergency power supply device 8 includes power storage unit 10, charging circuit 11 provided in an input path of power storage unit 10, discharging circuit 12 provided in an output path of power storage unit 10, input unit 13 connected to charging circuit 11, output unit 14 connected to discharging circuit 12, controller 15 that controls the operation of charging circuit 11 and discharging circuit 12, and signal receiver 16 connected to controller 15. Charging circuit 11 charges power storage unit 10. Discharging circuit 12 discharges power storage unit 10. Controller 15 is connected to power storage unit 10. Power storage unit 10 includes electric double-layer capacitors connected in series to one another. Power storage unit 10 may be configured with single electric double-layer capacitor 9. Each of electric double-layer capacitor 9 connected in series to one another has internal capacitance Cintp and internal resistance Rintp connected in series to internal capacitance Cintp. Power storage unit 10 equivalently has internal capacitance Cint and internal resistance Rint connected in series to internal capacitance Cint. Internal capacitance Cint is a combined capacitance obtained by combining internal capacitances Cintp of electric double-layer capacitors 9 connected in series to one another. Internal resistance Rint is a combined resistance obtained by combining internal resistances Rintp of electric double-layer capacitors 9 connected in series to one another.

Figure 2:
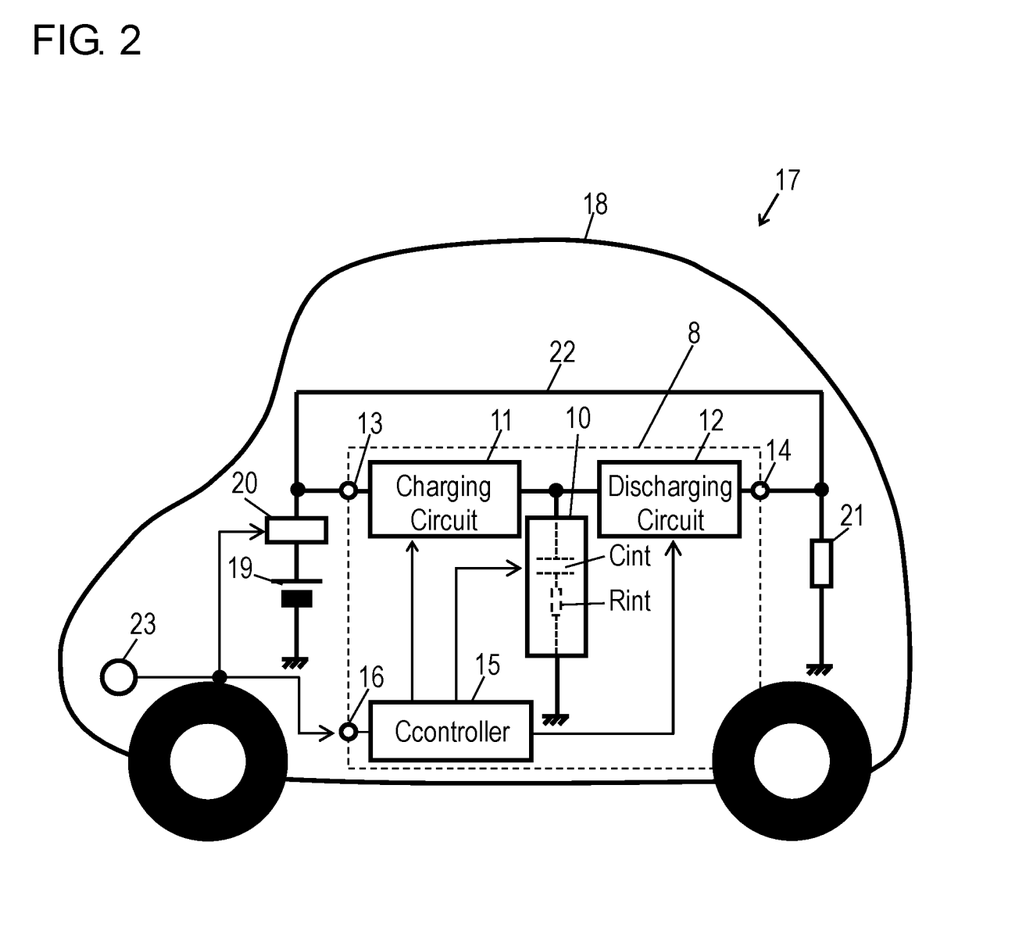
FIG. 2 is a block diagram of a vehicle having the in-vehicle emergency power supply device installed therein.

FIG. 2 is a block diagram of vehicle 17 having in-vehicle emergency power supply device 8 installed therein. Vehicle 17 includes vehicle body 18, in-vehicle emergency power supply device 8 mounted to vehicle body 18, battery 19 mounted to vehicle body 18, engine-linked switch 20 disposed in vehicle body 18, engine switch 23 disposed in vehicle body 18, vehicle load 21 mounted to vehicle body 18, and power supply line 22 connecting vehicle load 21 to engine-linked switch 20. Input unit 13 of in-vehicle emergency power supply device 8 is connected to battery 19 via engine-linked switch 20. Output unit 14 of in-vehicle emergency power supply device 8 is connected to vehicle load 21. Vehicle load 21 is also connected to battery 19 via engine-linked switch 20.

In a normal state of vehicle 17 and battery 19, power of battery 19 is supplied to vehicle load 21 through power supply line 22 when engine-linked switch 20 linked to starting of vehicle 17 is turned on. In the normal state of vehicle 17 and battery 19, charging circuit 11 of in-vehicle emergency power supply device 8 operates to charge power storage unit 10 continuously, intermittently, or at a predetermined timing. Power may be supplied from battery 19 to a part of load mounted to vehicle 17 regardless of starting of vehicle 17. This is not directly related to an operation of in-vehicle emergency power supply device 8, and thus its details are omitted in the description below.

When at least vehicle 17 or battery 19 falls into an abnormal state, discharging circuit 12 of in-vehicle emergency power supply device 8 operates to supply power stored in power storage unit 10 to vehicle load 21.

Figure 3:
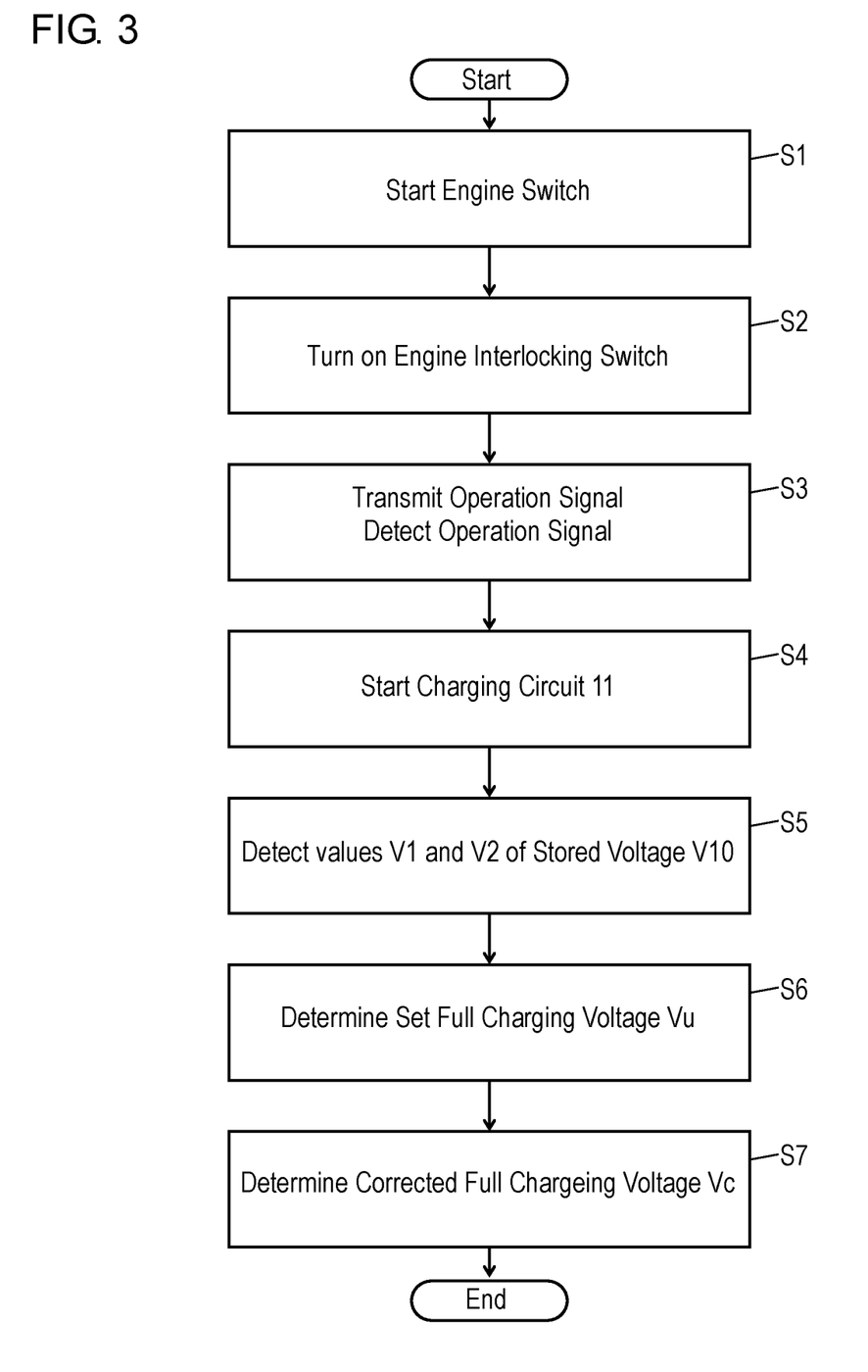
FIG. 3 is a flow chart illustrating an operation of the in-vehicle emergency power supply device in accordance with the embodiment.
Figure 4:
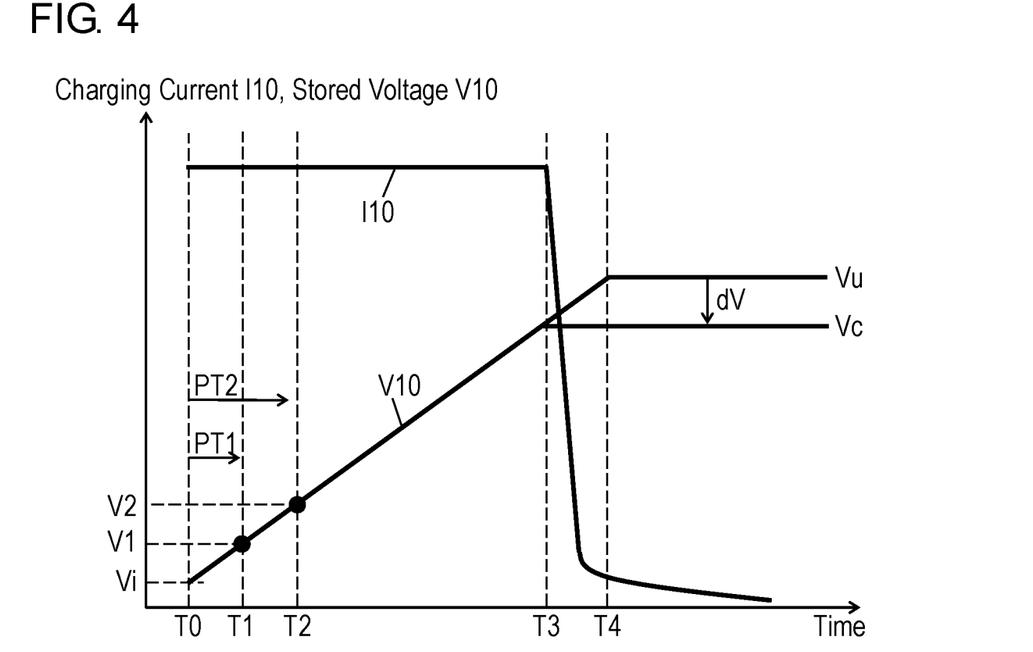
FIG. 4 is an operating characteristic chart of the operation shown in FIG. 3 of the in-vehicle emergency power supply device in accordance with the embodiment.
Figure 5:
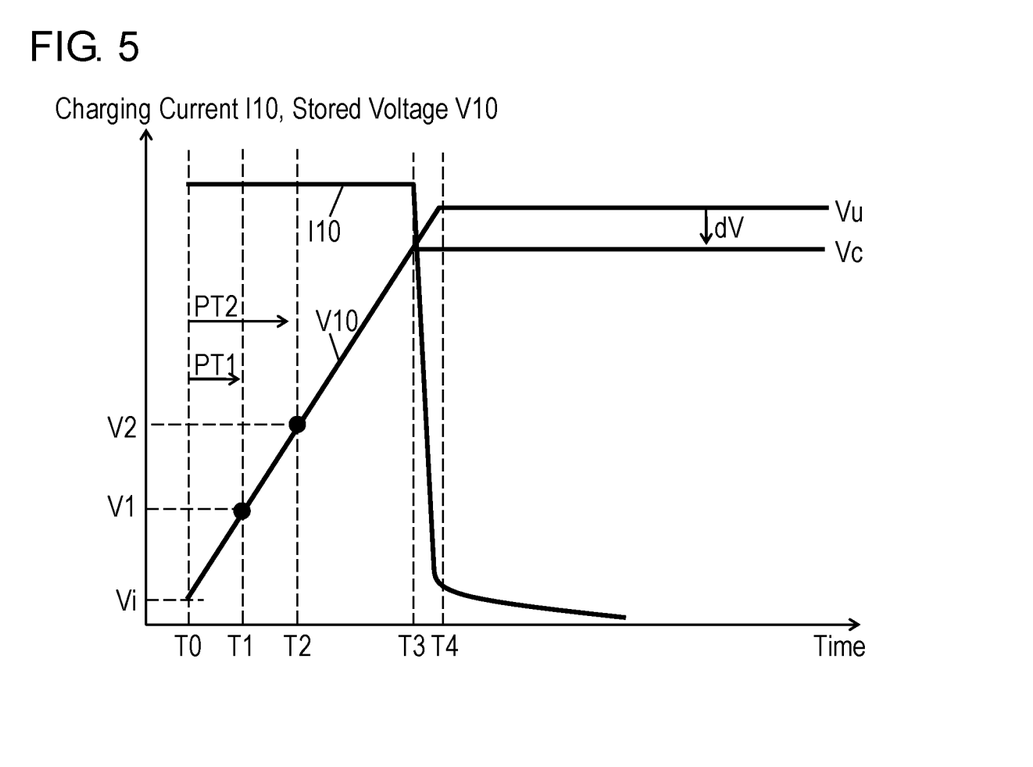
FIG. 5 is another operating characteristic chart of the operation shown in FIG. 3 of the in-vehicle emergency power supply device in accordance with the embodiment.

An operation of power storage unit 10, charging circuit 11, and controller 15 when vehicle 17 and battery 19 are in the normal state will be described below. FIG. 3 is a flow chart illustrating the operation of vehicle 17 and in-vehicle emergency power supply device 8. FIG. 4 and FIG. 5 are operating characteristic charts of the operation of in-vehicle emergency power supply device shown in FIG. 3. In FIG. 4 and FIG. 5, the horizontal axis represents time, and the vertical axis represents stored voltage V10 that is a voltage between both ends of power storage unit 10 and charging current I10 supplied by charging circuit 11 to power storage unit 10.

When a driver of vehicle 17 operates engine switch 23 to start vehicle 17 (Step S1), engine-linked switch 20 is turned on (Step S2). Simultaneously to the time when engine switch 23 starts vehicle 17 or after engine-linked switch 20 is turned on, signal receiver 16 of in-vehicle emergency power supply device 8 receives an operation signal, and controller 15 detects the operation signal (Step S3). In vehicle 17 according to the embodiment, the operation signal received by signal receiver 16 is transmitted from engine switch 23. The operation signal may be transmitted from a vehicle control device that comprehensively controls vehicle 17 according to switching of the engine switch. For convenience of description, signal receiver 16 is indicated as transmitting the signal from engine switch 23 to in-vehicle emergency power supply device 8. However, engine switch 23 may be directly connected to controller 15 to transmit the signal from engine switch 23 to in-vehicle emergency power supply device 8.

Upon detecting the operation signal, controller 15 starts charging circuit 11 at time point T0 immediately, after a predetermined period, or according to stored voltage V10 of power storage unit 10 (Step S4). Before Step S1 at which engine switch 23 starts vehicle 17, i.e., before vehicle 17 is started, power storage unit 10 is not charged in a full charge state, and is charged in a low charge state or has initial voltage V1 corresponding to a state that charging is close to zero. Upon starting charging circuit 11, charging circuit 11 starts to charge power storage unit 10 at time point T0 so that stored voltage V10 of power storage unit 10 reaches correction charging voltage Vc which is a predetermined level of charge state.

When charging circuit 11 starts to charge power storage unit 10 at time point T0, controller 15 starts to detect a value of stored voltage V10 corresponding to the charge state of power storage unit 10 as a voltage in a charging process. Alternatively, controller 15 is brought into a state that controller 15 can detect stored voltage V10 corresponding to the charge state of power storage unit 10 as a voltage in the charging process. Controller 15 then detects plural values V1 and V2 of stored voltage V10 of power storage unit 10 at time points T1 and T2 at which predetermined periods PT1 and PT2 pass from time point T0 at which charging circuit 11 started charging, respectively (Step S5).

Controller 15 determines set full charging voltage Vu based on values V1 and V2 of stored voltage V10, time points T1 and T2, and data previously stored in controller 15 (Step S6). An operation of controller 15 determining set full charging voltage Vu in Step S6 will be described below.

As shown in FIG. 1, electric double-layer capacitor 9 has internal capacitance Cint and internal resistance Rint connected in series to each other. Internal resistance Rint increases as electric double-layer capacitor 9 deteriorates. In order to supply the same voltage from power storage unit 10 to discharging circuit 12, a full charging voltage of electric double-layer capacitor 9 is determined higher by a voltage that drops due to internal resistance Rint when electric double-layer capacitor 9 is deteriorated than when electric double-layer capacitor 9 is not deteriorated. Set full charging voltage Vu is the product of the above full charging voltage of electric double-layer capacitor 9 and the number of electric double-layer capacitors 9. As electric double-layer capacitor 9 deteriorates, the full charging voltage is increased. In other words, the full charging voltage for supplying a predetermined voltage from power storage unit 10 to discharging circuit 12 is increased as electric double-layer capacitors 9 deteriorate.

While internal resistance Rint increases as electric double-layer capacitor 9 deteriorates, internal capacitance Cint of electric double-layer capacitor 9 decreases as electric double-layer capacitor 9 deteriorates. Therefore, in order to charge power storage unit 10 by supplying the same charging current from charging circuit 11 to power storage unit 10, electric double-layer capacitor 9 reaches the full charge in a shorter period in a condition that electric double-layer capacitor 9 is deteriorated than in a condition that electric double-layer capacitor 9 is not deteriorated. FIG. 4 shows the state before electric double-layer capacitor 9 deteriorates, and FIG. 5 shows the state after electric double-layer capacitor 9 deteriorates. As shown in FIG. 4 and FIG. 5, values V1 and V2 of stored voltage V10 increase after predetermined periods PT1 and PT2 pass from charging start time point T0. The difference between values V1 and V2 of stored voltage V10 starting from the same initial voltage V1 increases as electric double-layer capacitor 9 deteriorates.

Based on the above characteristic, internal resistance Rint of electric double-layer capacitor 9 and set full charging voltage Vu equivalent to the full charge voltage, values V1 and V2 of stored voltage V10 corresponding to predetermined periods Pt1 and Pt2, and the change of stored voltage V10 from value V1 to value V2 between time point T1 to time point T2 are correlated with respect to the progress of deterioration of electric double-layer capacitor 9. In other words, transition of a rate of change of stored voltage V10 per unit time at a predetermined charging current in response to the progress of deterioration of electric double-layer capacitor 9 is correlated with transition of set full charging voltage Vu in response to the progress of deterioration of electric double-layer capacitor 9. Or, transition of inclination of stored voltage V10 per unit time at a predetermined charging current in response to the progress of deterioration of electric double-layer capacitor 9 is correlated with transition of set full charging voltage Vu in response to the progress of deterioration of electric double-layer capacitor 9.

Accordingly, controller 15 determines set full charging voltage Vu corresponding to a degree of deterioration of electric double-layer capacitor 9 based on a relation between the time for which charging circuit 11 charges power storage unit 10 and stored voltage V10 in the charging process, or based on a relation between changes of charging time and stored voltage V10 under the condition that the charging current supplied from charging circuit 11 to power storage unit 10 at charging is kept constant at a predetermined current value.

The degree of deterioration of electric double-layer capacitor 9 is peculiar to each electric double-layer capacitor 9. Controller 15 previously stores data of plural values of set full charging voltage Vu corresponding to a relation between each of plural values of charging time while charging circuit 11 charges power storage unit 10 and respective one of plural values of stored voltage V10, or a relation between each of plural values of the charging time and respective one of plural values of a change of stored voltage V10 in a predetermined time period at the predetermined current value. Upon detecting stored voltage V10, controller 15 thus determines set full charging voltage Vu based on this previously-stored data.

More specifically, for example, data on the above relation between the rate of change or inclination of stored voltage V10 and set full charging voltage Vu is previously stored in controller 15 as predetermined values relative to electric double-layer capacitor 9. Controller 15 estimates and obtains set full charging voltage Vu at the time of measurement typically by comparison and calculation with reference to the stored data based on the rate of change or inclination of stored voltage V10 actually measured. Various charging current values are preferably employed as parameters. Controller 15 stores data on the relation of the rate of change or inclination of stored voltage V10 relative to each value of the charging current and the set full charging voltage Vu.

Controller 15 determines correction charging voltage Vc by subtracting margin voltage dV from set full charging voltage Vu obtained as described above (Step S6). Controller 15 controls charging circuit 11 to charge power storage unit 10 until stored voltage V10 of power storage unit 10 reaches correction charging voltage Vc. Margin voltage dV may be a fixed value or a value obtained by multiplying set full charging voltage Vu by a predetermined constant smaller than one.

As shown in FIG. 4 and FIG. 5, when charging circuit 11 charges power storage unit 10 with a fixed charging current continuously also after time point T2, stored voltage V10 continuously increases from value V2 and reaches correction charging voltage Vc at time point T3 and reaches set full charging voltage Vu at time point T4. In in-vehicle emergency power supply device 8 in accordance with the embodiment, charging circuit 11 completes, regardless of the progress of deterioration of electric double-layer capacitor 9, the charging of power storage unit 10 at time point T3 at which stored voltage V10 reaches correction charging voltage Vc lower than set full charging voltage Vu before stored voltage V10 reaches set full charging voltage Vu at time point T4. This configuration suppresses the progress of deterioration of power storage unit 10, and thus, suppresses reduction of storage capacity of power storage unit 10. Consequently, output power from in-vehicle emergency power supply device 8 is stabilized over a long period of time, and the lifetime of power storage unit 10 and in-vehicle emergency power supply device 8 is extended.

In conventional in-vehicle emergency power supply device 1 shown in FIG. 10, discharging circuit 4 boosts a voltage when supplying power to vehicle load 7. In particular, when power supplied to vehicle load 7 is large and supply period is long in the state power storage unit 2 deteriorates, the output voltage from discharging circuit 4 may not be stabilized.

In in-vehicle emergency power supply device 8 in accordance with the embodiment, the output voltage is stabilized over a long period of time, as described above, and also the lifetime of power storage unit 10 and in-vehicle emergency power supply device 8 is extended.

Figure 6:
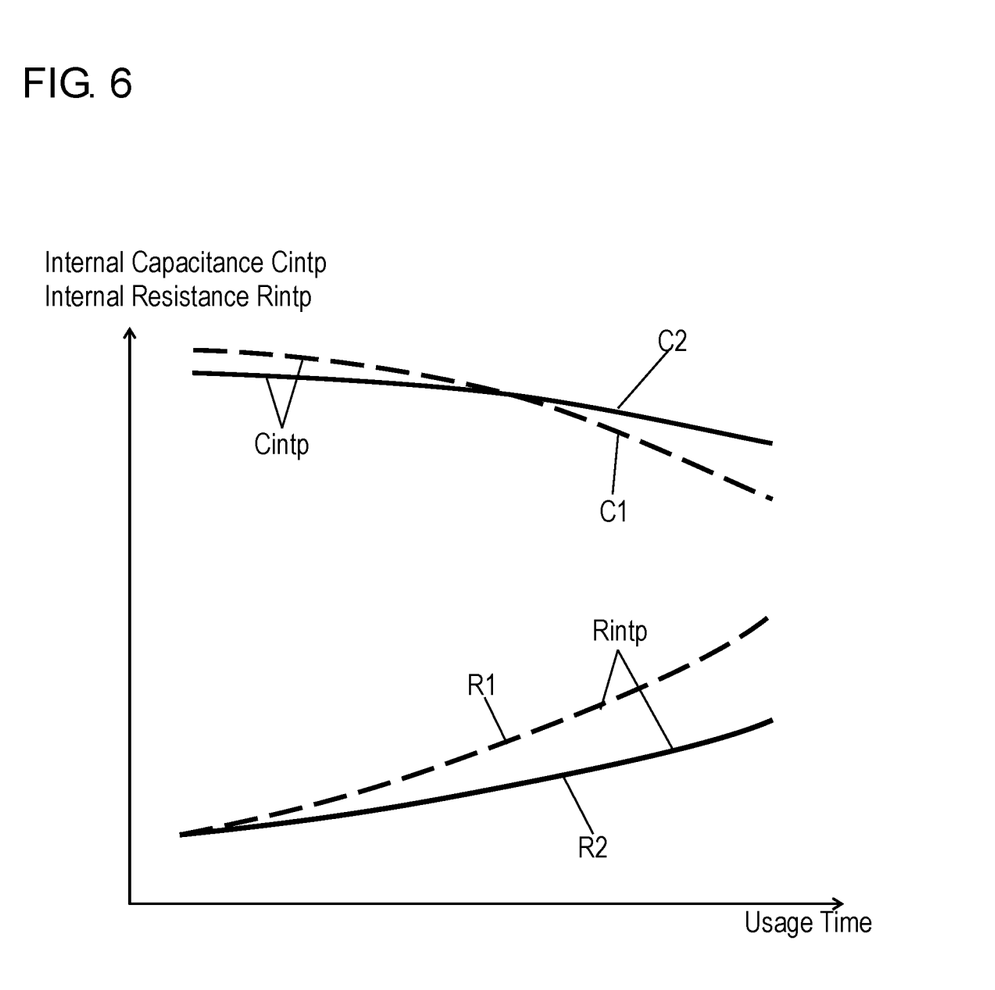
FIG. 6 is a life characteristic chart of a power storage unit of the in-vehicle emergency power supply device in accordance with the embodiment.

FIG. 6 is a life characteristic chart of electric double-layer capacitor 9 employed in power storage unit 10. In FIG. 6, the vertical axis represents internal capacitance Cintp and internal resistance Rintp of electric double-layer capacitor 9, and the horizontal axis represents usage time. FIG. 6 shows value C1 of internal capacitance Cintp and value R1 of internal resistance Rintp of electric double-layer capacitor 9 generally changing when power storage unit 10 is charged up to the full charging voltage plural times, and further shows value C2 of internal capacitance Cintp and value R2 of internal resistance Rintp changing when power storage unit 10 is charged up to a voltage lower than the full charging voltage plural times. As shown in FIG. 6, value C1 of internal capacitance Cintp changing when power storage unit 10 is charged up to the full charging voltage plural times for use decreases earlier than value C2 of internal capacitance Cintp changing when power storage unit 10 is charged up to a voltage lower than the full charging voltage for use plural times. In addition, value R1 of internal resistance Rintp changing when power storage unit 10 is charged up to the full charging voltage for use plural times increases earlier than value R2 of internal resistance Rintp changing when power storage unit 10 is charged up to a voltage lower than the full charging voltage plural times. In other words, electric double-layer capacitor 9 deteriorates faster when power storage unit 10 is charged up to the full charging voltage plural times than when it is charged up to a voltage lower than the full charging voltage plural times. Accordingly, power storage unit 10 including electric double-layer capacitor 9 and in-vehicle emergency power supply device 8 extend their lifetime by charging power storage unit 10 until stored voltage V10 reaches correction charging voltage Vc lower than set full charging voltage Vu. The output power from in-vehicle emergency power supply device 8 is thus stabilized for a long period of time.

Figure 7:
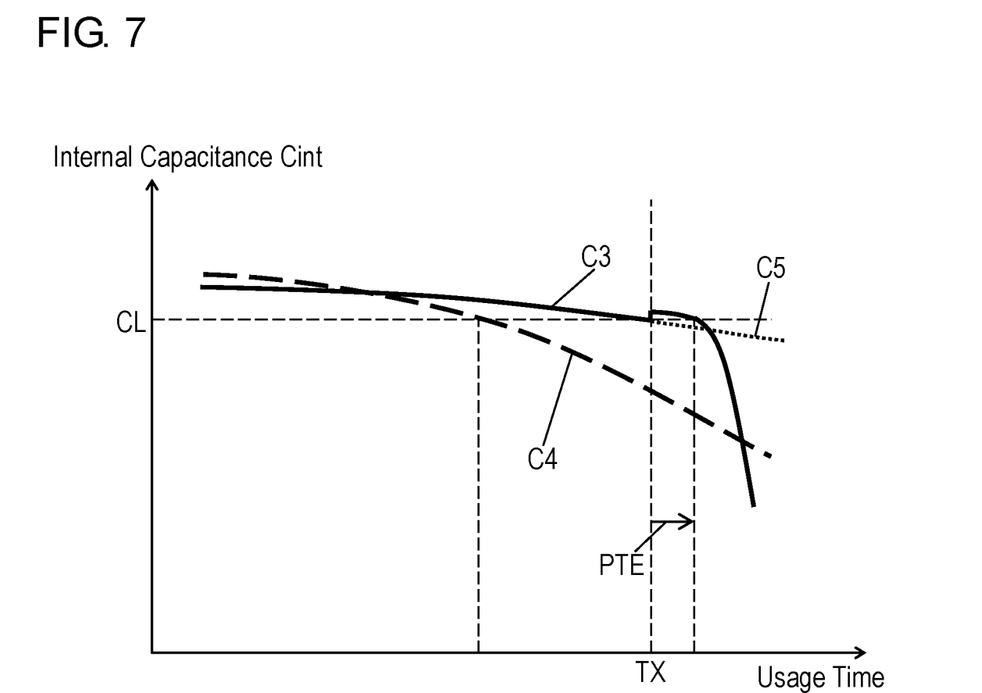
FIG. 7 is a life characteristic chart of the power storage unit of the in-vehicle emergency power supply device in accordance with the embodiment.

FIG. 7 shows a life characteristic chart of power storage unit 10 of in-vehicle emergency power supply device 8. In FIG. 7, the vertical axis represents internal capacitance Cint of power storage unit 10, and the horizontal axis represents usage time. FIG. 7 shows value C3 of internal capacitance Cint of power storage unit 10 of in-vehicle emergency power supply device 8. FIG. 7 further shows value C4 of internal capacitance Cint changing when power storage unit 10 is charged up to set full charging voltage Vu for use plural times and value C5 of internal capacitance Cint changing when power storage unit 10 is charged up to a voltage lower than set full charging voltage Vu for use plural times. As shown in FIG. 7, internal capacitance Cint of power storage unit 10 deceases with time as electric double-layer capacitor 9 deteriorates regardless of whether power storage unit 10 is charged almost to full charge using set full charging voltage Vu or charged to correction charging voltage Vc. However, the progress of deterioration accompanied by the decreasing of internal capacitance Cint of power storage unit 10 is suppressed by charging power storage unit 10 up to correction charging voltage Vc determined based on margin voltage dV. The charging of power storage unit 10 until stored voltage V10 reaches correction charging voltage Vc lower by margin voltage dV stabilizes the output voltage of in-vehicle emergency power supply device 8 in step-down discharge at the time of malfunction.

As described above, the full charging voltage is increased as electric double-layer capacitor 9 deteriorates. This configuration may result in further deterioration of electric double-layer capacitor 9. The utilizing of aforementioned margin voltage dV and correction charging voltage Vc drastically suppresses the progress of deterioration accompanied by the decreasing of internal capacitance Cint of power storage unit 10.

As already described related to internal resistance Rint, the full charging voltage of electric double-layer capacitor 9 is increased by an amount equivalent to a voltage drop due to internal resistance Rint, and the value of correction charging voltage Vc also increases as electric double-layer capacitor 9 deteriorates although margin voltage dV and correction charging voltage Vc are used. Still more, internal capacitance Cint of power storage unit 10 also decreases as the progress of deterioration of electric double-layer capacitor 9.

A change, i.e., decrease, of internal capacitance Cint according to the deterioration of electric double-layer capacitor 9 is correlated with a change, i.e., increase, of set full charging voltage Vu according to the deterioration of electric double-layer capacitor 9. Still more, a change, i.e., decrease, of internal capacitance Cint according to deterioration of electric double-layer capacitor 9 is correlated with a change, i.e., increase, of internal resistance Rint. This correlation is a characteristic or value peculiar to each electric double-layer capacitor 9, as described above, and thus the correlation is preferably stored in controller 15 previously as a value given to electric double-layer capacitor 9.

The aforementioned data on relation between a rate of change or inclination of stored voltage V10 and set full charging voltage Vu is previously stored in controller 15 as a value given to electric double-layer capacitor 9. Controller 15 estimates internal capacitance Cint at the time of measurement typically by comparison and calculation with reference to the above stored data and based on the rate of change or inclination of stored voltage V10 actually measured. Similarly to above, various charging current values are used as parameters, and data on relation between the rate of change or a value of inclination of stored voltage V10 and a value of internal capacitance Cint relative to each value of the charging current is preferably stored in controller 15.

In FIG. 7, limit capacitance CL is a lower limit of decreased internal capacitance Cint for appropriately operating discharging circuit 12 when power storage unit 10 is charged up to correction charging voltage Vc to which margin voltage dV is applied. When internal capacitance Cint decreases to limit capacitance CL at time point TX or below limit capacitance CL at time point TX, margin voltage dV is set to zero so that correction charging voltage Vc becomes the same value as set full charging voltage Vu. This configuration increases correction charging voltage Vc, and power storage unit 10 is charged to the full charge state. Accordingly, power storage unit 10 can retain the state of increased storage capacity over a certain period. In other words, the life of power storage unit 10, i.e., in-vehicle emergency power supply device 8 is extended for period PTE shown in FIG. 7. Limit capacitance CL may be determined based on the amount of power necessary for appropriately operating vehicle load 21. The above description explains an operation of power storage unit 10, charging circuit 11, and controller 15 mainly when vehicle 17 and battery 19 are in the normal state. Next, an operation of in-vehicle emergency power supply device 8 in the case that vehicle 17 and battery 19 fall into an abnormal state, and discharging circuit 12 discharges power stored in power storage unit 10 of in-vehicle emergency power supply device 8 will be described below.

In the normal state of vehicle 17 and battery 19, charging circuit 11 operates. In the abnormal state of vehicle 17 and battery 19, discharging circuit 12 operates as a step-down circuit to output reduced stored voltage V10. When vehicle 17 and battery 19 fall into the abnormal state, internal capacitance Cint of power storage unit 10 needs to be not less than limit capacitance CL, and stored voltage V10 of power storage unit 10 needs to be a voltage sufficient to operate discharging circuit 12 as the step-down circuit.

In other words, in the normal state of vehicle 17 and battery 19, stored voltage V10 is retained at a value higher than an output voltage from output unit 14 necessary for vehicle load 21. Accordingly, the output voltage from discharging circuit 12 does not fall into an unstable condition although power consumed by vehicle load 21 increases. On the other hand, when vehicle 17 and battery 19 are in the abnormal state, stored voltage V10 is required to be retained at a high voltage because discharging circuit 12 operates as a step-down circuit. Power storage unit 10 thus includes plural electric double-layer capacitors 9 connected in series to one another. Power storage unit 10 is charged to a voltage that retains the capacitance of power storage unit 10 to that equal to or higher than limit capacitance CL.

Accordingly, internal resistance Rint of power storage unit 10 is readily increased to readily suppress a discharge current at discharging power from power storage unit 10. As a result, the discharge current unlikely changes suddenly while the voltage of power storage unit 10 is retained at a value higher than a voltage required by output unit 14. A sudden change of discharge voltage due to a sudden change of discharge current thus unlikely occurs. In other words, discharge power is output from discharging circuit 12 at a stable voltage for a relatively long period. Particularly in the case that vehicle load 21 is a load, such as a motor, that temporarily requires a large current, vehicle load 21 stably operates even before and after the large current flows.

Charging circuit 11 may be a step-up circuit that boosts an input voltage for output, or a step-down circuit that decreases the input voltage for output. In other words, as long as the voltage of power storage unit 10 is higher than the voltage required in output unit 14, charging circuit 11 may perform either step-up operation or step-down operation.

Still more, as shown in FIG. 7, the usage of correction charging voltage Vc suppresses the decreasing of internal capacitance Cint due to deterioration of electric double-layer capacitor 9 while initial internal capacitance Cint of power storage unit 10 decreases corresponding to margin voltage dV. In particular, when discharging circuit 12 operates as a step-down circuit, the number of electric double-layer capacitors 9 connected in series in power storage unit 10 can be reduced. In other words, deterioration of storage capacity can be slowed down even though power storage unit 10 has low initial storage capacity. As long as the condition that power storage unit 10 has the voltage higher than the output voltage from discharging circuit 12 is satisfied, the initial voltage can be reduced by reducing the number of electric double-layer capacitors 9 connected in series and reducing an allowance against the deterioration of power storage unit 10. Accordingly, the volume and weight of power storage unit 10 and in-vehicle emergency power supply device 8 can be reduced. Further, in-vehicle emergency power supply device 8 provides a stable output voltage even when vehicle 17 and battery 19 fall into an abnormal state.

Furthermore, since power storage unit 10 is configured with plural electric double-layer capacitors 9 connected in series, margin voltage dV applied to power storage unit 10 is a single value and also acts almost uniformly on electric double-layer capacitors 9. Therefore, margin voltage dV can be easily determined and applied even though each electric double-layer capacitor 9 receives a small voltage value. As a result, margin voltage dV effectively suppresses deterioration of electric double-layer capacitor 9.

In the above operation, controller 15 detects values V1 and V2 of stored voltage V10 of power storage unit 10 at time points T1 and T2, and determines set full charging voltage Vu of power storage unit 10 based on two time points T1 and T2 and values V1 and V2 of stored voltage V10 with using the previously-stored data. However, controller 15 may determine set full charging voltage Vu based on values of stored voltage V10 detected at three or more time points. The large number of time points for detection can eliminate a value significantly deviating from a reference value beyond the limit in plural values of stored voltage V10. This configuration allows the controller to accurately determine values of set full charging voltage Vu and correction charging voltage Vc. Accordingly, the lifetime of power storage unit 10 including electric double-layer capacitor 9 and in-vehicle emergency power supply device 8 can be extended. In addition, the output power from in-vehicle emergency power supply device 8 is stabilized over a long period of time when vehicle 17 falls into an abnormal state. Vehicle load 21 can thus operate accurately.

Still more, controller 15 may determine set full charging voltage Vu and correction charging voltage Vc by detecting initial voltage V1 at time point 0 and value V1 of stored voltage V10 at time point T1 without detecting stored voltage V10 at time point T2.

In order to determine set full charging voltage Vu, a value of stored voltage V10 is detected before power storage unit 10 is fully charged. Accordingly, a timing to complete detection of stored voltage V10 of power storage unit 10 may be determined based on a time reaching full charge previously stored in controller 15 according to characteristics of electric double-layer capacitor 9, or based on a time reaching full charge recorded when vehicle 17 is previously driven.

In the above operation, charging circuit 11 charges power storage unit 10, and controller 15 detects stored voltage V10 of power storage unit 10 at predetermined plural time points to compare detected values with data previously-stored in controller 15. Based on the comparison, controller 15 determines set full charging voltage Vu, and then, finally determines correction charging voltage Vc. However, controller 15 can determine set full charging voltage Vu and correction charging voltage Vc by another operation.

As described above, when controller 15 causes charging circuit 15 to charge power storage unit 10, controller 15 detects values V1 and V2 of stored voltage V10 of power storage unit 10 after predetermined plural periods PT1 and PT2 pass from starting of supplying power to power storage unit 10 by charging circuit 11. Controller 15 determines set full charging voltage Vu of power storage unit 10 based on plural values V1 and V2 of stored voltage V10 of power storage unit 10 and predetermined plural periods PT1 and PT2. Controller 15 determines correction charging voltage Vc lower than set full charging voltage Vu based on set full charging voltage Vu. Controller 15 then controls charging circuit 11 to charge power storage unit 10 until stored voltage V10 reaches correction charging voltage Vc.

Controller 15 may determine correction charging voltage Vc by subtracting margin voltage dV from set full charging voltage Vu.

Controller 15 may increase correction charging voltage Vc when internal capacitance Cint of power storage unit 10 decreases and reaches limit capacitance CL.

Figure 8:
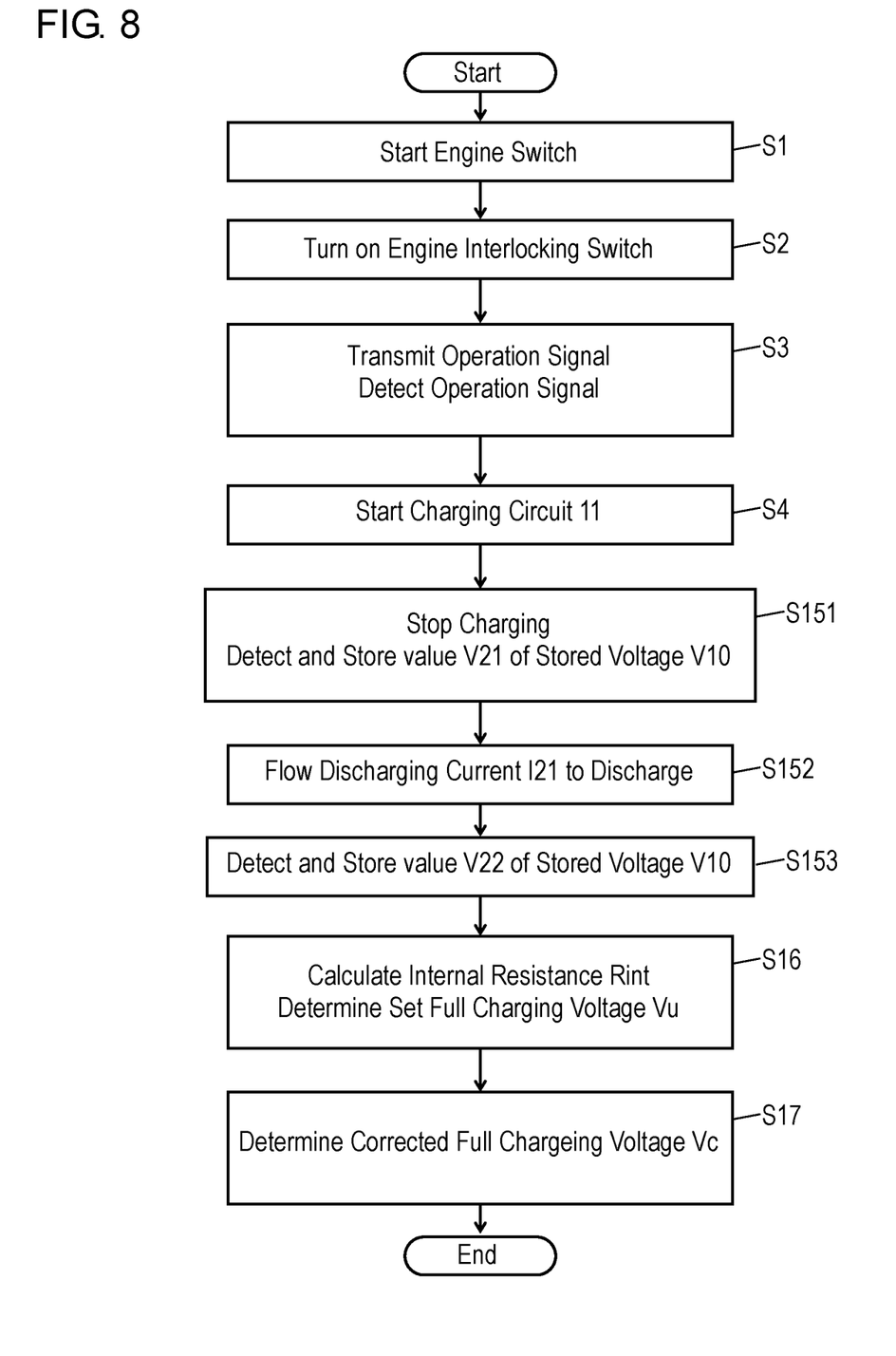
FIG. 8 is a flow chart illustrating another operation of the in-vehicle emergency power supply device in accordance with the embodiment.
Figure 9:
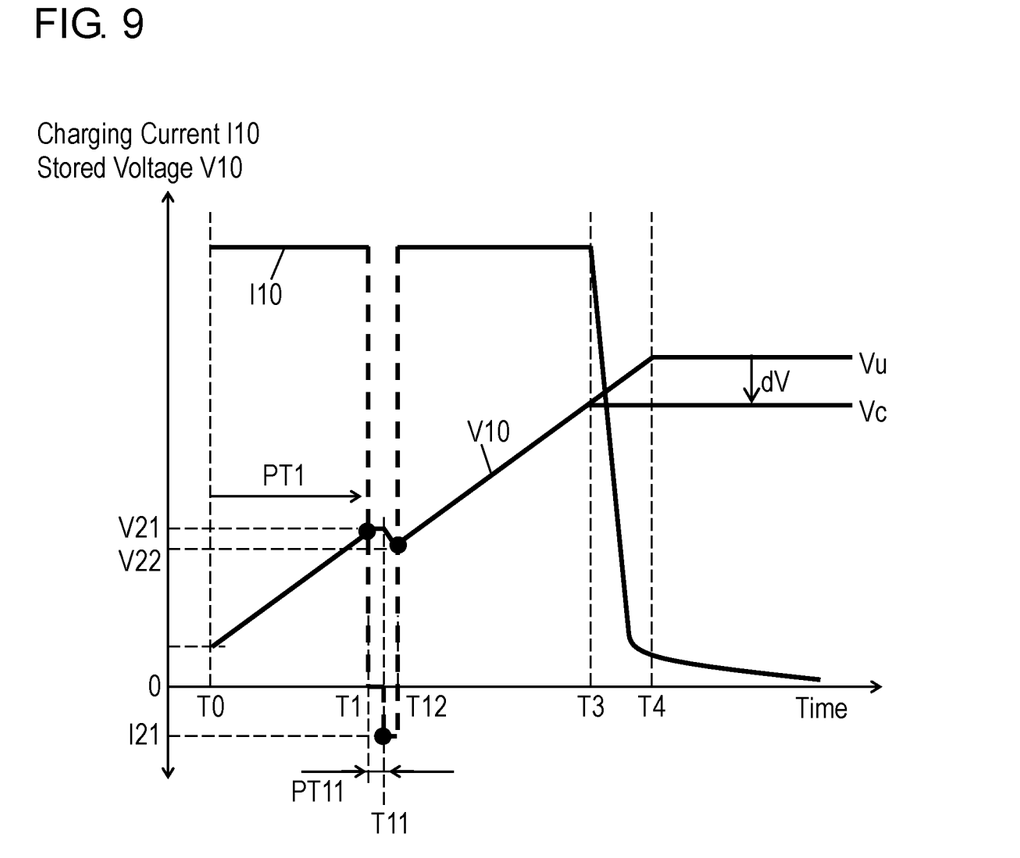
FIG. 9 is an operating characteristic chart of the operation shown in FIG. 8 of the in-vehicle emergency power supply device in accordance with the embodiment.

FIG. 8 is a flow chart illustrating another operation of in-vehicle emergency power supply device 8 in the exemplary embodiment. FIG. 9 is an operating characteristic chart of the operation of the in-vehicle emergency power supply device shown in FIG. 8. In FIG. 8 and FIG. 9, items identical to those of FIG. 3 to 5 are denoted by the same reference numerals. In the operation shown in FIG. 8, controller 15 obtains a value of internal resistance Rint of power storage unit 10 based on a test current and stored voltage V10 of power storage unit 10. Then, set full charging voltage Vu is determined based on the value of internal resistance Rint, and finally, correction charging voltage Vc is determined.

In the normal state of vehicle 17 and battery 19, controller 15 starts charging circuit 11 at time point T0 immediately upon detecting an operation signal, periodically, or according to a terminal voltage of power storage unit 10 (Step S4). Before engine switch 23 is set to the vehicle start condition, i.e., when vehicle 17 does not start, power storage unit 10 is set to initial voltage V1 that is a low-level charge state or a charge state close to empty, instead of full-charge state. By activating charging circuit 11, charging to power storage unit 10 starts to reach correction charging voltage Vc so that stored voltage V10 between both ends of power storage unit 10 is at a predetermined level of the charge state.

Before charging circuit 11 starts charging power storage unit 10, or at time point T1 after charging circuit 11 starts to charge power storage unit 10 for predetermined period PT1, charging circuit 11 temporarily stops the charging of power storage unit 10 at time point T1 so that charging current I10 flowing in power storage unit 10 becomes zero. While the charging of power storage unit 10 by charging circuit 11 is stopped, controller 15 or power storage unit 10 first measures and detects a value of voltage difference V21 between both ends of power storage unit 10, and temporarily stores the value of the voltage difference (Step A151). Voltage difference V21 may be stored voltage V10. Next, at time point T11 after passing predetermined period PT11 from time point T1, controller 15 supplies test current I21 to power storage unit 10 to discharge power stored in electric double-layer capacitor 9 (Step S152). Test current I21 is a negative value. Discharging circuit 12 may be used for discharging power of electric double-layer capacitor 9. Alternatively, another circuit provided in in-vehicle emergency power supply device 8 may be used. Power storage unit 10 has internal resistance Rint. Therefore, a loss due to internal resistance Rint reduces the detected voltage difference between both ends of power storage unit 10 from value V21 to value V22 when test current I1 is supplied to power storage unit 10. Value V22 of the voltage difference may be stored voltage V10, similarly to value V21 of the voltage difference. Then, controller 15 detects and temporarily stores value V22 of the voltage difference (Step S153). Controller 15 calculates a value of internal resistance Rint by dividing a difference between value V21 and V22 of the voltage difference by test current I21 (Step S16). Stored voltage V10 of power storage unit 10 may be transmitted to controller 15 as information after detection by charging circuit 11, or controller 15 may directly detect stored voltage V10.

Value V21 of stored voltage V10 of power storage unit 10 is detected before supplying test current I21 and value V22 of stored voltage V10 of power storage unit 10 while supplying test current I21. After that, charging circuit 11 restarts to charge power storage unit 10 at time point T12.

Based on test current I21 and values V21 and V22 of stored voltage V10 of power storage unit 10 detected as described above, controller 15 in accordance with the embodiment divides the difference between values V21 and V22 of stored voltage V10 by test current I21 to calculate internal resistance Rint of power storage unit 10. Furthermore, controller 15 determines set full charging voltage Vu based on the value of internal resistance Rint (Step S16). Set full charging voltage Vu may be determined based on data which is previously stored in controller 15 and which indicates relation between set full charging voltage Vu and internal resistance Rint.

A value of internal resistance Rint increases as electric double-layer capacitor 9 deteriorates. As described above, a full charging voltage necessary for supplying a predetermined voltage from power storage unit 10 to discharging circuit 12 increases as electric double-layer capacitor 9 deteriorates.

As described above, internal resistance Rint of electric double-layer capacitor 9 is correlated with set full charging voltage Vu equivalent to the full charging voltage. Accordingly, controller 15 determines set full charging voltage Vu corresponding to a degree of deterioration of electric double-layer capacitor 9 based on the value of internal resistance Rint of power storage unit 10.

The degree of deterioration of electric double-layer capacitor 9 is a value peculiar to each of electric double-layer capacitors 9. Accordingly, controller 15 previously stores data on plural values of set full charging voltage Vu corresponding to respective values of changing internal resistance Rint of power storage unit 10. Controller 15 takes value V21 of stored voltage V10 of power storage unit 10 and test current I21 to obtain internal resistance Rint, and then, obtains set full charging voltage Vu based on the previously-stored data.

Controller 15 determines correction charging voltage Vc by subtracting margin voltage dV from set full charging voltage Vu obtained as described above (Step S17). Controller 15 controls charging circuit 11 to charge power storage unit 10 until stored voltage V10 of power storage unit 10 reaches correction charging voltage Vc. Margin voltage dV may be a fixed value or a value calculated by multiplying set full charging voltage Vu by a predetermined constant less than one.

In the above structure and operation, charging circuit 11 completes the charging of power storage unit 10 at a value lower than the full charging voltage before the value reaches the full charging voltage regardless of a degree of deterioration of electric double-layer capacitor 9. In general, in electric double-layer capacitor 9 of power storage unit 10, a level of increase of internal resistance Rint or a level of decrease of storage capacity in accordance with deterioration of electric double-layer capacitor 9 changes depending on the time scale of life, between the case of charging to a value close to the full charge and the case of charging to a value lower than the full charge, as shown in FIG. 6. Accordingly, the lifetime of power storage unit 10 including electric double-layer capacitor 9 and in-vehicle emergency power supply device is extended by charging power storage unit 10 with utilizing correction charging voltage Vc lower than set full charging voltage Vu. The output power from in-vehicle emergency power supply device 8 is thus stabilized over a long period of time.

Stored voltage V10 at above predetermined time point T1 is detected before power storage unit 10 reaches the full charge. Accordingly, the time from the starting of the charging to the completing of the detection of stored voltage V10 of power storage unit 10 may be determined based on a time previously stored in controller 15 required for power storage unit 10 to reach the full charge according to characteristics of electric double-layer capacitor 9, or a time spent for reaching the full charge recorded when vehicle 17 is driven previously.

In the above operation, internal resistance Rint of power storage unit 10 at preset time point T1 is calculated utilizing test current I21 flowing in power storage unit 10 and value V21 of stored voltage V10 of power storage unit 10. Controller 15 may directly obtain internal resistance Rint at preset time point T1 utilizing test current I21 flowing in power storage unit 10 and value V21 of stored voltage V10 of power storage unit 10 based on data, previously stored in controller 15, on relation between value V21, test current I21, and internal resistance Rint.

In the above operation, the value of internal resistance Rint is obtained from the relation between single value V21 of stored voltage V10 and test current I21. Value V21 and test current I21 may be detected at plural time points instead of only a single time point. Detection at plural time points eliminates a value that significantly deviates from a reference value in detected values. Accordingly, further accurate values of set full charging voltage Vu and correction charging voltage Vc can be obtained. The lifetime of power storage unit 10 including electric double-layer capacitors 9 and in-vehicle emergency power supply device 8 can thus be extended, and the output power from in-vehicle emergency power supply device 8 is stabilized over a long period of time.

In particular, charging circuit 11 operates as a step-up circuit and discharging circuit 12 operates as a step-down circuit. This configuration effectively uses aforementioned limit capacitance CL. In other words, by retaining a value of stored voltage V10 of power storage unit 10 higher than the output voltage, the output voltage from discharging circuit 12 can be stabilized even when power consumed by vehicle load 21 increases.

Charging circuit 11 may operate as either a step-up circuit or a step-down circuit. In other words, as long as stored voltage V10 of power storage unit 10 has a value higher than a voltage required in output unit 14, charging circuit 11 may operate as either the step-up circuit or step-down circuit.

As described above, controller 15 performs the next operation to cause charging circuit 11 to charge power storage unit 10. Controller 15 supplies test current I21 to power storage unit 10, and detects stored voltage V10 of power storage unit 10 while test current I21 is supplied. Controller 15 then obtains internal resistance Rint of power storage unit 10 based on detected stored voltage V10 and test current I21. Controller 15 determines set full charging voltage Vu of power storage unit 10 corresponding to internal resistance Rint. Controller 15 then determines correction charging voltage Vc lower than set full charging voltage Vu based on set full charging voltage Vu. Controller 15 controls charging circuit 11 to charge power storage unit 10 until stored voltage V10 reaches correction charging voltage Vc.

Controller 15 may also perform the next operation to charge power storage unit 10 by charging circuit 11. Controller 15 temporarily stops the power supply from charging circuit 11 after predetermined period PT1 passes from the starting of the supplying power from charging circuit 11 to power storage unit 10, and detects test current I21 supplied to power storage unit 10 and stored voltage V10 of power storage unit 10 in accordance with test current I21. Controller 15 determines correction charging voltage Vc by subtracting margin voltage dV from set full charging voltage Vu. Controller 15 then controls charging circuit 11 to further charge power storage unit 10 until stored voltage V10 reaches correction charging voltage Vc.

REFERENCE MARKS IN THE DRAWINGS 8 in-vehicle emergency power supply device
9 electric double-layer capacitor
10 power storage unit
11 charging circuit
12 discharging circuit
13 input unit
14 output unit
15 controller
16 signal receiver
17 vehicle
18 vehicle body
19 battery
20 engine-linked switch
21 vehicle load
22 power supply line
23 engine switch

The invention claimed is:

1. An in-vehicle emergency power supply device comprising:
   a power storage unit including an electric double-layer capacitor;
   a charging circuit configured to charge the power storage unit;
   a discharging circuit configured to discharge the power storage unit; and
   a controller configured to control the charging circuit and the discharging circuit,
   wherein the controller is configured to:
      cause the charging circuit to start charging the power storage unit;
      detect a first voltage of the power storage unit at a first time point and a second voltage of the power storage unit at a second time point later than the first time point;
      obtain a rate of change of a voltage of the power storage unit per unit time based on the first voltage, the second voltage, the first time point and the second time point;
      determine an estimated full charging voltage of the power storage unit based on the rate of change of the voltage of the power storage unit;
      determine a correction charging voltage lower than the estimated full charging voltage; and
      after the correction charging voltage is determined, cause the charging circuit to charge the power storage unit by operating the charging circuit until the stored voltage reaches the correction charging voltage.

2. The in-vehicle emergency power supply device of claim 1, wherein the controller is configured to determine the correction charging voltage by subtracting a margin voltage from the estimated full charging voltage.

3. The in-vehicle emergency power supply device of claim 1, wherein the discharging circuit is configured to reduce the voltage of the power storage unit.

4. The in-vehicle emergency power supply device of claim 1,
   wherein the power storage unit has an internal capacitance, and
   wherein the controller is configured to increase the correction charging voltage when the internal capacitance of the power storage unit decreases and reaches a limit capacitance.

5. The in-vehicle emergency power supply device of claim 4,
   wherein the controller is configured to:
      determine the correction charging voltage by subtracting a margin voltage from the estimated full charging voltage; and
      increase the correction charging voltage by decreasing the margin voltage when the internal capacitance of the power storage unit decreases and reaches a limit capacitance.

6. The in-vehicle emergency power supply device of claim 1, wherein the power storage unit includes a plurality of electric double-layer capacitors connected in series to one another.

7. The in-vehicle emergency power supply device of claim 1, wherein the charging circuit is configured to charge the power storage unit at a constant current value.

8. The in-vehicle emergency power supply device of claim 1, wherein:
   the controller stores plural values of the estimated full charging voltage corresponding to plural values of the rate of change of the voltage of the power storage unit per unit time, and
   the controller is further configured to determine the estimated the full charging voltage of the power storage unit based on the rate of change of the voltage of the power storage unit per unit time and the plural values of the estimated full charging voltage.

9. An in-vehicle emergency power supply device comprising:
   a power storage unit including a plurality of electric double-layer capacitors connected in series to one another;
   a charging circuit configured to charge the power storage unit;
   a discharging circuit configured to discharge the power storage unit; and
   a controller configured to control the charging circuit and the discharging circuit,
   wherein the controller is configured to:
      cause the charging circuit to start charging the power storage unit;
      temporarily stop the charging of the power storage unit, detect a first stored voltage of the power storage unit while the charging by the charging circuit is stopped;
      after the first stored voltage is detected, supply a test current to the power storage unit, and detect a second stored voltage of the power storage unit while the test current is supplied;
      after the second stored voltage is detected, restart the charging the power storage unit;

obtain an internal resistance of the power storage unit based on the test current and a difference between the detected first stored voltage and the detected second stored voltage;

determine an estimated full charging voltage of the power storage unit based on the internal resistance;

determine a correction charging voltage lower than the estimated full charging voltage; and after the correction charging voltage is determined, cause the charging circuit to charge the power storage unit until a stored voltage of the power storage unit reaches the correction charging voltage.

10. The in-vehicle emergency power supply device of claim 9, wherein the controller is configured to:

temporarily stop the charging of the power storage unit by the charging circuit after a predetermined period passes from a starting of the charging the power storage unit by the charging circuit, and determine the correction charging voltage by subtracting a margin voltage from the estimated full charging voltage.

11. The in-vehicle emergency power supply device of claim 9, wherein the discharging circuit is configured to operate as a step-down circuit.

12. The in-vehicle emergency power supply device of claim 9, wherein the test current is supplied to discharge the power storage unit.

* * * * *